United States Patent
Choi et al.

(10) Patent No.: US 9,052,548 B2
(45) Date of Patent: Jun. 9, 2015

(54) PHOTO-CURABLE COMPOSITION, OPTICAL ANISTROPIC FILM AND ITS PREPARATION METHOD

(71) Applicant: LG CHEM, LTD., Seoul (KR)

(72) Inventors: Dai-Seung Choi, Daejeon (KR); Dong-Woo Yoo, Daejeon (KR); Sung-Ho Chun, Daejeon (KR); Mi-Ra Hong, Gangwon-do (KR); Jeong-Yoon Han, Seoul (KR); Hyeong-Bin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/685,151

(22) Filed: Nov. 26, 2012

(65) Prior Publication Data

US 2014/0002785 A1    Jan. 2, 2014

(30) Foreign Application Priority Data

Nov. 28, 2011 (KR) ......................... 10-2011-0125204
Nov. 26, 2012 (KR) ......................... 10-2012-0134259

(51) Int. Cl.
| | | |
|---|---|---|
| *C09K 19/52* | (2006.01) | |
| *C09K 19/54* | (2006.01) | |
| *C09K 19/34* | (2006.01) | |
| *C09K 19/24* | (2006.01) | |
| *G02F 1/1334* | (2006.01) | |
| *G02F 1/1337* | (2006.01) | |
| *G02B 5/30* | (2006.01) | |
| *C09K 19/20* | (2006.01) | |
| *C09K 19/56* | (2006.01) | |
| *C09K 19/04* | (2006.01) | |

(52) U.S. Cl.
CPC ........ *G02F 1/133711* (2013.01); *G02B 5/3016* (2013.01); *C09K 2219/03* (2013.01); *G02F 1/1334* (2013.01); *G02F 1/133788* (2013.01); G02F 2001/133726 (2013.01); *C09K 19/2014* (2013.01); *C09K 19/24* (2013.01); *C09K 19/3491* (2013.01); *C09K 19/56* (2013.01); C09K 2019/0448 (2013.01); C09K 2019/3425 (2013.01)

(58) Field of Classification Search
CPC ............ G02B 5/3016; Y10T 428/1005; G02F 1/133711; G02F 1/1334; G02F 1/133788; G02F 2001/133726; C09K 19/24; C09K 19/2014; C09K 19/54; C09K 19/56; C09K 2019/3425; C09K 2019/0448; C09K 2219/03
USPC ........... 428/1.1, 1.2, 1.31; 252/299.01, 299.5; 349/86, 88, 93, 117, 123
See application file for complete search history.

(56) References Cited

FOREIGN PATENT DOCUMENTS

| | | | |
|---|---|---|---|
| CN | 101928750 A | * | 12/2010 |
| JP | 2011-026526 A | | 2/2011 |
| KR | 10-0671753 | | 1/2007 |
| KR | 10-0762832 | | 9/2007 |
| KR | 10-0789247 | | 12/2007 |
| KR | 10-2009-0047720 | | 5/2009 |
| KR | 10-2009-0079843 A | | 7/2009 |
| KR | 10-0946552 | | 3/2010 |
| KR | 10-0955569 | | 4/2010 |
| KR | 10-0982394 | | 9/2010 |
| KR | 10-10027763 | | 12/2010 |
| KR | 10-2011-0025377 | | 3/2011 |
| KR | 10-1041401 | | 10/2011 |
| KR | 10-1079807 | | 10/2011 |
| KR | 10-2012-0004915 | | 1/2012 |
| KR | 10-2012-0011796 A | | 2/2012 |

OTHER PUBLICATIONS

English translation provided by EPO for CN-101928750, 2010.*

* cited by examiner

*Primary Examiner* — Shean C Wu
(74) *Attorney, Agent, or Firm* — McKenna Long & Aldridge LLP

(57) ABSTRACT

The present invention relates to a photo-curable composition that can provide a film, etc. showing excellent optical anisotropy even without need for separately forming a liquid crystal layer and an alignment layer, an optical anisotropic film using the same, and its preparation method. The photo-curable composition comprises a photo-alignable polymer, a non-crosslinkable liquid crystal compound and a photo-curable binder.

23 Claims, No Drawings

PHOTO-CURABLE COMPOSITION, OPTICAL ANISTROPIC FILM AND ITS PREPARATION METHOD

This application is a Utility Application which claims priority to and the benefit of Korean Patent Application No. 10-2011-0125204, filed on Nov. 28, 2011 and Korean Patent Application No. 10-2012-0134259, filed on Nov. 26, 2012, which are hereby incorporated by reference in their entirety herein.

FIELD OF THE INVENTION

The present invention relates to a photo-curable composition, an optical anisotropic film and its preparation method. More specifically, the present invention relates to a photo-curable composition that can provide a film, etc. showing excellent optical anisotropy even without need for separately forming a liquid crystal layer and an alignment layer, an optical anisotropic film using the same, and its preparation method.

BACKGROUND OF THE INVENTION

As a liquid crystal display has been large-sized recently, its use is extended from a mobile phone, a notebook, etc. for individual use to a wall-hanging television, etc. for family use. Accordingly, high-definition, high-graded and wide-view are required for the liquid crystal display. In particular, since a thin film transistor liquid crystal display (TFT-LCD) driven by a thin film transistor independently drives the individual pixels, the response rate of liquid crystal may be very excellent to realize a high-definition dynamic image, of which application thus is enlarged.

In order for the liquid crystal to be used as a light activated switch in such TFT-LCD, the liquid crystal must be initially aligned in a certain direction on the thin film transistor layer formed at the most interior side of a display cell, for which a liquid crystal alignment layer is used. In particular, recently, the application of photo-alignment method wherein the liquid crystal alignment layer is aligned by light such as UV is widely approached.

Typically, for such photo-alignment, an alignment layer containing a photo-reactive polymer is formed in the lower part of the liquid crystal layer, and a photoreaction is resulted by the irradiation of linearly polarized UV on the alignment layer. As a result, the photo-alignment wherein the main chain of the photo-reactive polymer is arranged in a certain direction occurs, and the liquid crystal contained in the upper part layer may be aligned under the influence of such photo-induced alignment layer.

For the process of such photo-alignment, however, both of alignment layer and liquid crystal layer are needed to be formed, which makes the whole process complicated. In order to simplify this process, the liquid crystal photo-alignment using a monolayer has been reviewed. However, when this technique is applied, there are many cases that the liquid crystal alignment (optical anisotropy), etc. are not sufficient.

SUMMARY OF THE INVENTION

Thus, the present invention provides a photo-curable composition that can provide a film, etc. showing excellent optical anisotropy even without need for separately forming a liquid crystal layer and an alignment layer.

The present invention also provides an optical anisotropic film precursor or an optical anisotropic film formed by using said photo-curable composition.

The present invention also provides a simplified method for preparing the optical anisotropic film by using said photo-curable composition.

The present invention provides a photo-curable composition which comprises a photo-alignable polymer, a non-crosslinkable liquid crystal compound and a photo-curable binder.

The present invention also provides a method for preparing an optical anisotropic film, which comprises a step of photo-aligning at least a part of a photo-alignable polymer by irradiating polarized UV light on said photo-curable composition.

The present invention also provides an optical anisotropic film precursor which comprises said photo-curable composition formed on a substrate.

The present invention also provides an optical anisotropic film which comprises a cured product of said photo-curable composition formed on a substrate.

Such an optical anisotropic film may have a function as liquid crystal alignment layer, liquid crystal alignment film, optical filter, retardation film, polarizer or polarized light emitter, each of which is applicable for various optical devices such as a liquid crystal display device.

Thus, the present invention furthermore provides a liquid crystal cell which comprises said optical anisotropic film. In this liquid crystal cell, said optical anisotropic film may be included as a liquid crystal alignment film, liquid crystal alignment layer, etc., and the liquid crystal cell comprising such an optical anisotropic film may be a polymer dispersed liquid crystal (PDLC), etc.

DETAILED DESCRIPTION OF THE EMBODIMENT

Hereinafter, the photo-curable composition, the optical anisotropic film using the same, its preparation method, etc. according to embodiments of the present invention are to be explained.

Some terms as used herein may be defined to have the following meanings unless they are explained to have other special meanings.

If a substance, polymer, functional group, etc. can show the "photo-alignment property" or "photo-reactivity," it means that the corresponding substance, polymer, functional group, etc. may be developed or arranged in a certain direction depending on the direction of polarized light to induce the arrayal or alignment of the liquid crystal compound when linearly polarized light, for example, linearly polarized UV is irradiated.

The term "noncrosslinkable liquid crystal compound" may refer to a substance that does not contain any polymerizable, crosslinkable or curable unsaturated group in a molecule (e.g., at the end of the molecule) but contains one or more mesogenic groups to show the phase behavior of liquid crystal. Said mesogenic group may be any mesogenic functional groups contained in the previously known liquid crystal compounds. Scope and kind thereof are widely known to those skilled in the art.

The expression "(photo-)cured product" of any composition or the composition "is (photo-)cured" covers not only the case that all the components having a curable or crosslinkable unsaturated group among the components of the composition are cured, crosslinked or polymerized, but also the case that parts thereof are cured, crosslinked or polymerized.

The expression that the photo-curable composition or cured product thereof is formed as "a monolayer" may refer to the case that other layer containing the same type of component as the photo-curable composition does not exist on the substrate. For example, the expression that the photo-curable composition comprising a photo-alignable polymer and a (noncrosslinkable) liquid crystal compound, or the cured product thereof is formed as "a monolayer" may mean that other layer containing a substance showing the photo-alignment property or liquid crystal property does not exist on the same substrate, in the same device, or in the same cell, and the corresponding photo-alignable polymer and liquid crystal compound are contained only in the corresponding monolayer. However, it is of course possible that other layer containing different type of component exists on the substrate.

On the other hand, according to one embodiment of the present invention, there is provided a photo-curable composition which comprises a photo-alignable polymer, a non-crosslinkable liquid crystal compound and a photo-curable binder.

As a result of the present inventor's experiment, it has been identified that the functional groups contained in the photo-alignable polymer are photo-reacted to be arranged in a certain direction (e.g., the photo-alignable polymer is photo-aligned) when the linearly polarized UV is irradiated on the photo-curable composition according to one embodiment, and at the same time liquid crystal alignment of the non-crosslinkable liquid crystal compound can occur under the influence of such photo-aligned polymer. Thus, in case that said photo-curable composition is used, the liquid crystal alignment using the photo-alignment can proceed even without separately forming both of an alignment layer and a liquid crystal layer.

Furthermore, a binder resin having the network crosslink structure may be formed by curing said photo-curable binder at the same time as, or after, said photo-alignment. If the aligned liquid crystal compound is contained in the crosslink structure in a homogeneously dispersed form, the alignment adopted by the liquid crystal compound may be stabilized by the crosslink structure.

Thus, by using the composition according to one embodiment of the present invention, there can be provided a film, etc. showing excellent liquid crystal alignment or optical anisotropy even without need for separately forming a liquid crystal layer and an alignment layer.

On the other hand, recently, it has been tried to form an optical anisotropic film, etc. as a monolayer by using a composition comprising a photo-alignable substance and a crosslinkable liquid crystal substance (e.g., reactive mesogene). However, when the photo-alignment and liquid crystal alignment are achieved by using such a composition, careful control of initial reaction condition is needed for the liquid crystal substance not to be crosslinked or polymerized at the initial stage of the photo-alignment. If the control of initial reaction condition is not enough, or even if the control of initial reaction condition accompanies, a considerable amount of the liquid crystal substance may be crosslinked, cured or polymerized already in the initial stage of the photo-alignment. In this case, the functional group of the crosslinked, cured or polymerized liquid crystal substance may be constrained, and the liquid crystal alignment may not be suitably achieved even under the influence of the photo-alignable substance. Thus, the earlier optical anisotropic film formed as a monolayer may show poor liquid crystal alignment or optical anisotropy, which may make the preparation method of the optical anisotropic film, etc. very difficult and deteriorate the optical anisotropy thereof.

However, since the composition according to one embodiment of the present invention comprises a noncrosslinkable liquid crystal compound that has no worry of being polymerized or crosslinked as such, the above stated problem may be solved. Furthermore, the excellent alignment of said liquid crystal compound may be stabilized by the crosslink structure of the binder resin. Therefore, by using the composition according to one embodiment of the present invention, it is possible to make the preparation method of optical anisotropic film, etc. easier and to provide optical anisotropic film, etc. showing excellent characteristics.

Hereinafter, the photo-curable composition according to one embodiment of the present invention will be explained in detail for each component.

The composition according to one embodiment of the present invention comprises a photo-alignable polymer. The photo-alignable polymer is any photo-alignable polymer containing one or more photo-reactive functional groups, and any previously-known polymer may be used with no limitation. Said photo-reactive functional group may also be cinnamate functional group, chalcone functional group, coumarin functional group, etc. known as showing photo-reactivity to the linearly polarized UV. For example, as such a photo-alignable polymer, those disclosed in Korean Patent Nos. 1002763, 0789247, 0671753, 0762832, 0982394, 1079807, 0946552, 0955569 and 1071401, Korean Patent Laid-open Publication Nos. 2011-0025377 and 2009-0047720, Korean Patent Application No. 2011-0027125, etc. may be used. Other photo-alignable polymers having the above-stated photo-reactive functional groups may also be used.

On the other hand, the photo-reactive functional group contained in said photo-alignable polymer may be selected from the group consisting of a cinnamate functional group having the following Formula 1a, a coumarin functional group having the following Formula 1b, an azo functional group having the following Formula 1c, a chalcone functional group having the following Formula 1d and a chalcone functional group having the following Formula 1e, or may be two or more functional groups selected therefrom:

[Formula 1a]

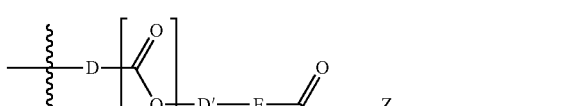

[Formula 1b]

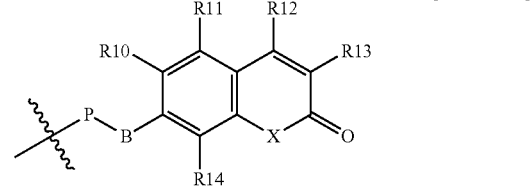

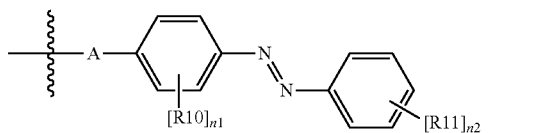
[Formula 1c]

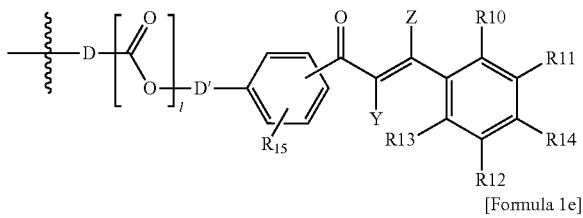
[Formula 1d]

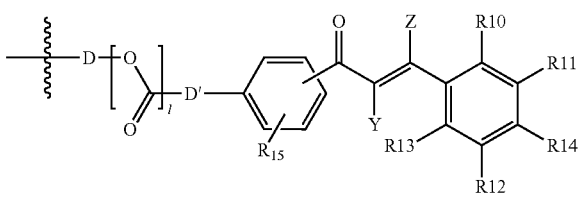
[Formula 1e]

in the above Formulas 1a to 1e, n1 is an integer of 0 to 4, n2 is an integer of 0 to 5, l is 0 or 1, A represents unsubstituted or substituted alkylene having 1 to 20 carbon atoms, carbonyl, carboxy, unsubstituted or substituted arylene having 6 to 40 carbon atoms, or a single bond, B is selected from the group consisting of a single bond; unsubstituted or substituted alkylene having 1 to 20 carbon atoms; carbonyl; carboxy; ester; unsubstituted or substituted alkoxylene having 1 to 10 carbon atoms; unsubstituted or substituted arylene having 6 to 40 carbon atoms; and unsubstituted or substituted heteroarylene having 6 to 40 carbon atoms, D and D' are independently selected from the group consisting of a single bond; oxygen; unsubstituted or substituted alkylene having 1 to 20 carbon atoms; unsubstituted or substituted cycloalkylene having 3 to 12 carbon atoms; and unsubstituted or substituted alkylene oxide having 1 to 20 carbon atoms, E represents a single bond; unsubstituted or substituted alkylene having 1 to 20 carbon atoms; or unsubstituted or substituted arylene oxide having 6 to 40 carbon atoms, X represents oxygen or sulfur, Y and Z independently represent hydrogen; or unsubstituted or substituted alkyl having 1 to 20 carbon atoms, P is selected from the group consisting of a single bond; unsubstituted or substituted alkylene having 1 to 20 carbon atoms; carbonyl; unsubstituted or substituted alkenylene having 2 to 20 carbon atoms; unsubstituted or substituted cycloalkylene having 3 to 12 carbon atoms; unsubstituted or substituted arylene having 6 to 40 carbon atoms; unsubstituted or substituted aralkylene having 7 to 15 carbon atoms; and unsubstituted or substituted alkynylene having 2 to 20 carbon atoms, $R_{10}$, $R_{11}$, $R_{12}$, $R_{13}$ and $R_{14}$ are the same as or different from each other and are independently selected from the group consisting of hydrogen; halogen; unsubstituted or substituted alkyl having 1 to 20 carbon atoms; unsubstituted or substituted cycloalkyl having 4 to 8 carbon atoms; unsubstituted or substituted alkoxy having 1 to 20 carbon atoms; unsubstituted or substituted aryloxy having 6 to 30 carbon atoms; unsubstituted or substituted aryl having 6 to 40 carbon atoms; heteroaryl having 6 to 40 carbon atoms and containing a heteroatom from Group XIV, XV or XVI; unsubstituted or substituted alkoxyaryl having 6 to 40 carbon atoms; cyano; nitrile; nitro; and hydroxy, and $R_{15}$ is one or two substituents which are independently selected from the group consisting of hydrogen; halogen; cyano; unsubstituted or substituted alkyl having 1 to 20 carbon atoms; unsubstituted or substituted alkoxy having 1 to 20 carbon atoms; unsubstituted or substituted aryloxy having 6 to 30 carbon atoms; unsubstituted or substituted aryl having 6 to 40 carbon atoms; heteroaryl having 6 to 40 carbon atoms and containing a heteroatom from Group XIV, XV or XVI; and unsubstituted or substituted alkoxyaryl having 6 to 40 carbon atoms.

According to the use of the photo-alignable polymer having the photo-reactive functional group in such a specific structure, more excellent photo-alignment and more effective interaction with the liquid crystal compound can be resulted in. Thus, there may be provided a film showing more excellent liquid crystal alignment and optical anisotropy by using the composition according to one embodiment of the present invention.

Said photo-alignable polymer may comprise various types of repeating units such as olefin repeating unit or acrylate repeating unit, etc. and may have a structure wherein one or more above-stated photo-reactive functional groups are bonded to such a repeating unit. However, in view of the points of thermal stability, alignment stability, etc. of the photo-alignable polymer, the polymer may comprise a cyclic olefin repeating unit such as norbornene repeating unit and may have a structure wherein one or more photo-reactive functional groups are bonded to such a repeating unit. For example, said photo-alignable polymer may comprise a repeating unit of the following Formula 3 or 4:

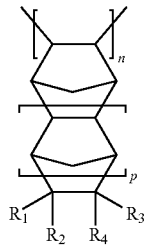
[Formula 3]

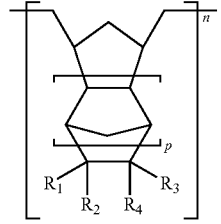
[Formula 4]

in the above Formulas 3 and 4, n is 50 to 5,000, p is an integer of 0 to 4, and at least one of $R_1$, $R_2$, $R_3$ and $R_4$ is a radical selected from the group consisting of the above Formulas 1a to 1e, and the others may be the same as or different from each other and are independently polar functional groups selected from the group consisting of hydrogen; halogen; unsubstituted or substituted alkyl having 1 to 20 carbon atoms; unsubstituted or substituted alkenyl having 2 to 20 carbon atoms; unsubstituted or substituted cycloalkyl having 5 to 12 carbon atoms; unsubstituted or substituted aryl having 6 to 40 carbon atoms; unsubstituted or substituted aralkyl having 7 to 15 carbon atoms; unsubstituted or substituted alkynyl having 2 to 20 carbon atoms; and non-hydrocarbonaceous polar group containing one or more atoms selected from the group consisting of oxygen, nitrogen, phosphorous, sulfur, silicon and boron.

In the repeating units of Formulas 3 and 4, said non-hydrocarbonaceous polar group may be selected from the group consisting of the following functional groups, or may be other various polar functional groups:

—$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_5O)_k$—$OR_6$, —$(OR_5)_kOR_6$, —$C(O)$—$O$—$C(O)OR_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$—, —$R_5C(=S)SR_6$, —$R_5SO_3R_6$, —$SO_3R_6$, —$R_5N=C=S$, —$N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$,

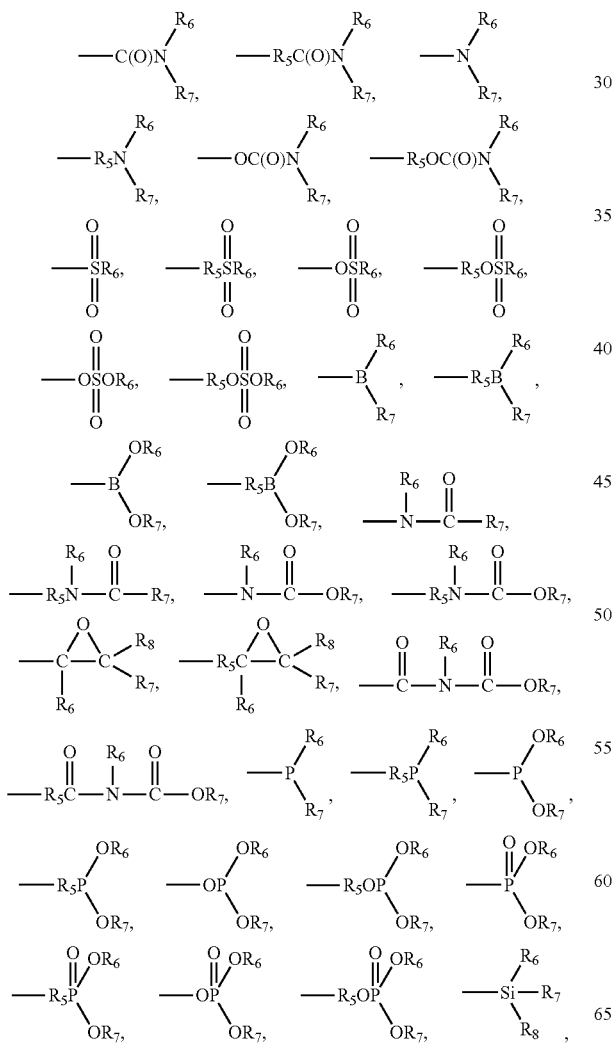

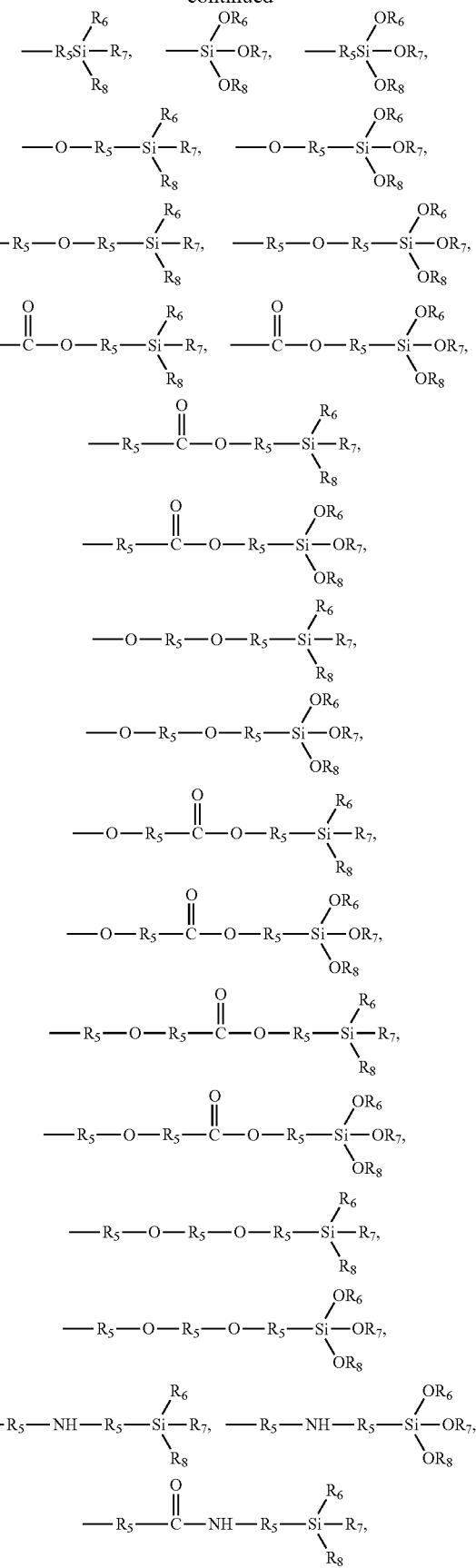

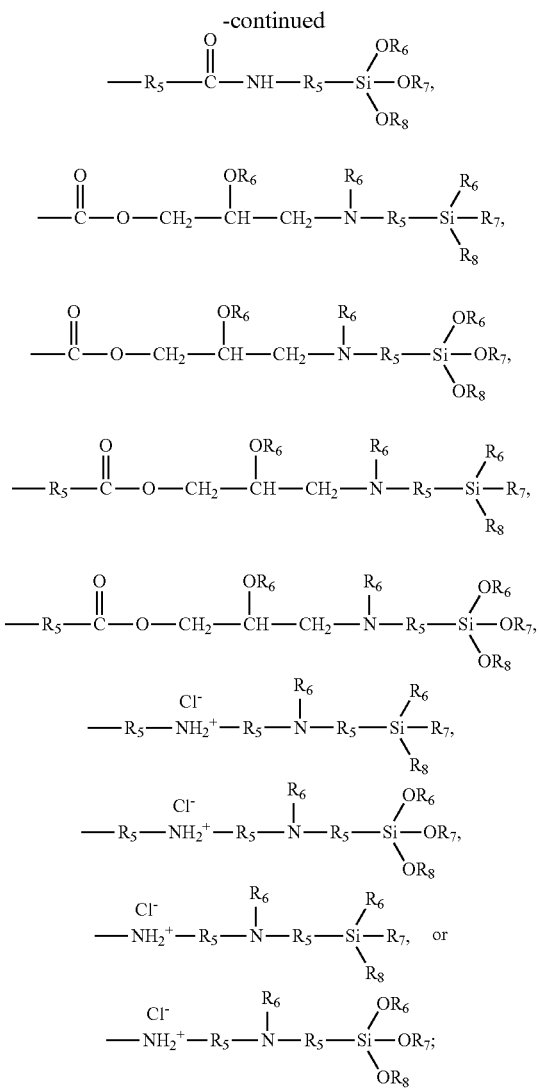

in the above polar functional groups, $R_5$ is the same as or different from each other and is independently linear or branched alkylene having 1 to 20 carbon atoms and being unsubstituted or substituted by one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; linear or branched alkenylene having 2 to 20 carbon atoms and being unsubstituted or substituted by one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; linear or branched alkynylene having 3 to 20 carbon atoms and being unsubstituted or substituted by one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; cycloalkylene having 3 to 12 carbon atoms and being unsubstituted or substituted by one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; arylene having 6 to 40 carbon atoms and being unsubstituted or substituted by one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; alkoxylene having 1 to 20 carbon atoms and being unsubstituted or substituted by one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; or carbonyloxylene having 1 to 20 carbon atoms and being unsubstituted or substituted by one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy, $R_6$, $R_7$ and $R_8$ are the same as or different from each other and are independently hydrogen; halogen; linear or branched alkyl having 1 to 20 carbon atoms and being unsubstituted or substituted by one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; linear or branched alkenyl having 2 to 20 carbon atoms and being unsubstituted or substituted by one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; linear or branched alkynyl having 3 to 20 carbon atoms and being unsubstituted or substituted by one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; cycloalkyl having 3 to 12 carbon atoms and being unsubstituted or substituted by one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; aryl having 6 to 40 carbon atoms and being unsubstituted or substituted by one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; alkoxy having 1 to 20 carbon atoms and being unsubstituted or substituted by one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; or carbonyloxy having 1 to 20 carbon atoms and being unsubstituted or substituted by one or more substituents selected from halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy, and k is independently an integer of 1 to 10.

In addition, in the repeating units of above Formulas 3 and 4, the heteroaryl group having 6 to 40 carbon atoms and containing a heteroatom from Group XIV, XV or XVI, or the aryl group having 6 to 40 carbon atoms may be one or more selected from the group consisting of the following functional groups, but are not limited thereto:

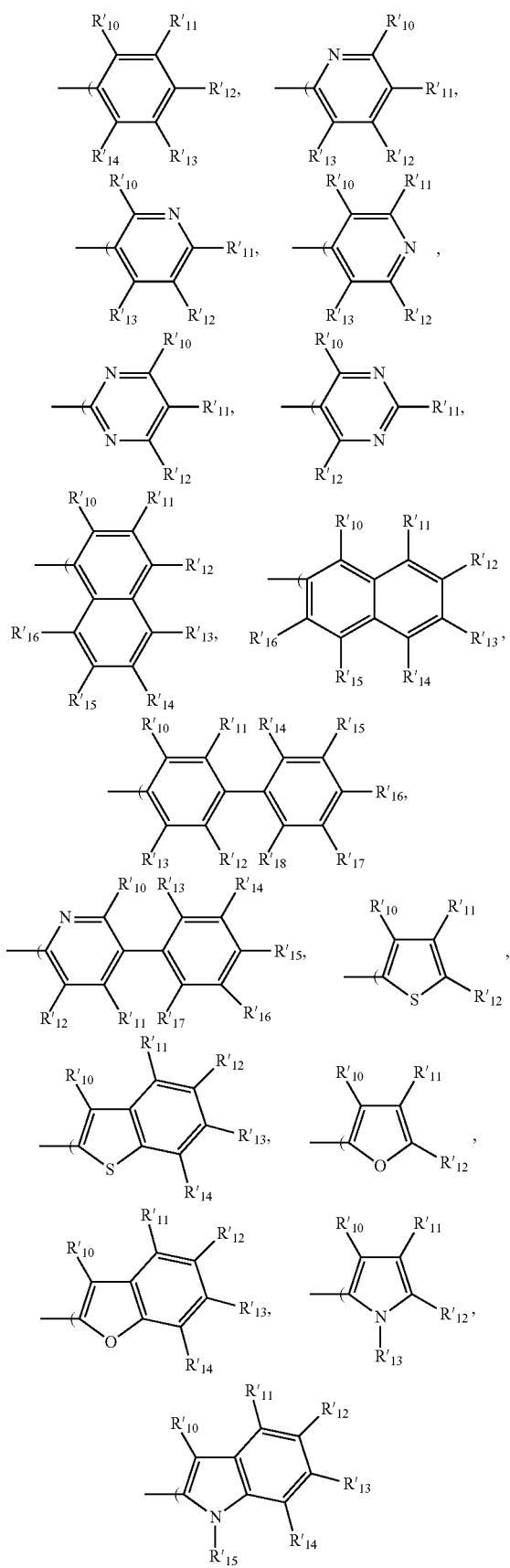

in the above formulas, at least one of R'$_{10}$, R'$_{11}$, R'$_{12}$, R'$_{13}$, R'$_{14}$, R'$_{15}$, R'$_{16}$, R'$_{17}$ and R'$_{18}$ is unsubstituted or substituted alkoxy having 1 to 20 carbon atoms or unsubstituted or substituted aryloxy having 6 to 30 carbon atoms, and the others may be the same as or different from each other and are independently hydrogen, unsubstituted or substituted alkyl having 1 to 20 carbon atoms, unsubstituted or substituted alkoxy having 1 to 20 carbon atoms, unsubstituted or substituted aryloxy having 6 to 30 carbon atoms, or unsubstituted or substituted aryl having 6 to 40 carbon atoms.

The above-stated photo-alignable polymer may be a homopolymer consisting of a single repeating unit such as the repeating unit of Formula 3 or 4, but may be a copolymer comprising two or more repeating units. However, for realizing more excellent alignment and optical anisotropy, the photo-alignable polymer may contain a repeating unit having one or more the above-stated photo-reactive functional groups, for example, a cyclic olefin repeating unit having such a photo-reactive functional, more specifically a repeating unit of the above Formula 3 or 4, in the amount of about 50 mol % or more, or about 60 mol % or more, or about 70 mol % or more, or about 80 mol % or more, or about 90 mol % or more, based on the total repeating units of the photo-alignable polymer.

Also, in the structure of the above-stated photo-alignable polymer, each of the substituents may be defined as follows:

First, the term "alkyl" means a linear or branched, saturated and monovalent hydrocarbon moiety having 1 to 20 carbon atoms, preferably 1 to 10 carbon atoms, and more preferably 1 to 6 carbon atoms. The alkyl group may be referred to as including those further substituted by some substituents as listed below as well as those unsubstituted. Examples thereof may include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl, etc.

The term "alkenyl" means a linear or branched and monovalent hydrocarbon moiety having one or more carbon-carbon double bonds and 2 to 20 carbon atoms, preferably 2 to 10 carbon atoms, and more preferably 2 to 6 carbon atoms. The alkenyl group may be combined via the carbon atom contained in carbon-carbon double bond or the saturated carbon atom. The alkenyl group may be referred to as including those further substituted by some substituents as listed below as well as those unsubstituted. Examples thereof may include ethenyl, 1-propenyl, 2-propenyl, 2-butenyl, 3-butenyl, pentenyl, 5-hexenyl, dodecenyl, etc.

The term "cycloalkyl" means a saturated or unsaturated, nonaromatic and monovalent monocyclic, bicyclic or tricyclic hydrocarbon moiety having 3 to 12 ring carbon atoms. It may be referred to as including even those further substituted by some substituents as listed below. Examples thereof may include cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (i.e., bicyclo[2,2,1]hept-5-enyl), etc.

The term "aryl" means a monovalent and monocyclic, bicyclic or tricyclic aromatic hydrocarbon moiety having 6 to 40 ring atoms, and preferably 6 to 12 ring atoms. It may be referred to as including even those further substituted by some substituents as listed below. Examples thereof may include phenyl, naphthalenyl, fluorenyl, etc.

The term "alkoxyaryl" means the above-defined aryl group wherein one or more hydrogen atoms are replaced by alkoxy groups. Examples thereof may include methoxyphenyl, ethoxyphenyl, propoxyphenyl, butoxyphenyl, pentoxyphenyl, hextoxyphenyl, heptoxy, octoxy, nanoxy, methoxybiphenyl, methoxynaphthalenyl, methoxyfluorenyl, methoxyanthracenyl, etc.

The term "aralkyl" means the above-defined alkyl group wherein one or more hydrogen atoms are replaced by aryl groups. It may be referred to as including even those further substituted by some substituents as listed below. Examples thereof may include benzyl, benzhydryl, trityl, etc.

The term "alkynyl" means a linear or branched and monovalent hydrocarbon moiety having one or more carbon-carbon triple bonds and 2 to 20 carbon atoms, preferably 2 to 10 carbon atoms, and more preferably 2 to 6 carbon atoms. The alkynyl group may be combined via the carbon atom contained in carbon-carbon triple bond or the saturated carbon atom. It may be referred to as including even those further substituted by some substituents as listed below. Examples thereof may include ethinyl, propinyl, etc.

The term "alkylene" means a linear or branched, saturated and divalent hydrocarbon moiety having 1 to 20 carbon atoms, preferably 1 to 10 carbon atoms, and more preferably 1 to 6 carbon atoms. It may be referred to as including even those further substituted by some substituents as listed below. Examples thereof may include methylene, ethylene, propylene, butylene, hexylene, etc.

The term "alkenylene" means a linear or branched and divalent hydrocarbon moiety having one or more carbon-carbon double bonds and 2 to 20 carbon atoms, preferably 2 to 10 carbon atoms, and more preferably 2 to 6 carbon atoms. The alkenylene group may be combined via the carbon atom contained in carbon-carbon double bond and/or the saturated carbon atom. It may be referred to as including even those further substituted by some substituents as listed below.

The term "cycloalkylene" means a saturated or unsaturated, nonaromatic and divalent monocyclic, bicyclic or tricyclic hydrocarbon moiety having 3 to 12 ring carbon atoms. It may be referred to as including even those further substituted by some substituents as listed below. Examples thereof may include cyclopropylene, cyclobutylene, etc.

The term "arylene" means a divalent and monocyclic, bicyclic or tricyclic aromatic hydrocarbon moiety having 6 to 20 ring atoms, and preferably 6 to 12 ring atoms. It may be referred to as including even those further substituted by some substituents as listed below. The aromatic moiety contains carbon atoms only. Examples of the arylene group may include phenylene, etc.

The term "aralkylene" means a divalent moiety wherein one or more hydrogen atoms of the above-defined alkyl group are replaced by aryl groups. It may be referred to as including even those further substituted by some substituents as listed below. Examples thereof may include benzylene, etc.

The term "alkynylene" means a linear or branched and divalent hydrocarbon moiety having one or more carbon-carbon triple bonds and 2 to 20 carbon atoms, preferably 2 to 10 carbon atoms, and more preferably 2 to 6 carbon atoms. The alkynylene group may be combined via the carbon atom contained in carbon-carbon triple bond or the saturated carbon atom. It may be referred to as including even those further substituted by some substituents as listed below. Examples thereof may include ethinylene, propinylene, etc.

The expression "is unsubstituted or substituted" in the above-explained substituents means to include not only each of these substituents as such but also those further substituted by some substituents. In the present specification, examples of the substituents by which each substituents can be further substituted may include halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, siloxy, etc.

The method for preparing the above-stated photo-alignable polymer is obviously known to those skilled in the art from various literatures disclosing several photo-alignable polymers. Examples of such literatures have already been mentioned above.

In the case that the photo-alignable polymer contains the repeating unit of Formula 3, for example, this polymer may be prepared by a method of forming the repeating unit of Formula 3 by addition polymerization of the monomer of Formula 2 in the presence of a catalyst composition comprising a promoter and a precatalyst containing a transition metal of Group X:

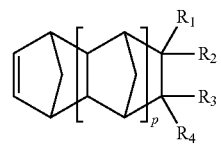

[Formula 2]

in the above Formula 2, p, $R_1$, $R_2$, $R_3$ and $R_4$ are as defined in Formula 3.

Also, in the case that the photo-alignable polymer contains the repeating unit of Formula 4, this polymer may be prepared by a method of forming the repeating unit of Formula 4 by ring-opening polymerization of the monomer of Formula 2 in the presence of a catalyst composition comprising a promoter and a precatalyst containing a transition metal of Group IV, VI or VIII. As an alternative method that can be selected, the photo-alignable polymer containing the repeating unit of Formula 4 may be prepared by ring-opening polymerizing norbornene (alkyl)ol such as norbornene methanol, etc. as a monomer in the presence of a catalyst composition comprising a promoter and a precatalyst containing said transition metal of Group IV, VI or VIII to form a five-membered ring-opening polymer and then by introducing a photo-reactive functional group to the ring-opening polymer. Here, the introduction of said photo-reactive functional group may be carried out via a condensation reaction of said ring-opening polymer with an acyl chloride compound or a carboxylic acid compound having the photo-reactive functional group corresponding to Formulas 1a to 1e.

In said ring-opening polymerization step, the ring-opening may be carried out by the addition of hydrogen to the double bond in norbornene ring contained in the monomer of Formula 2, along which polymerization may be carried out to prepare the repeating unit of Formula 4 and the photo-reactive polymer containing the same.

However, since the specific process and reaction condition for preparing the above-stated photo-alignable polymer are widely known to those skilled in the art, more explanation thereon will be omitted here.

On the other hand, the photo-curable composition according to one embodiment of the present invention comprises a noncrosslinkable liquid crystal compound together with the above-stated photo-alignable polymer. Such a noncrosslinkable liquid crystal compound may refer to a compound that does not contain in its molecule (e.g., at the end of the molecule) a polymerizable, crosslinkable or curable unsaturated group, for example, ethylenically unsaturated group, acrylate group, etc., but contains one or more mesogenic groups to show the phase behavior of liquid crystal. This noncrosslinkable liquid crystal compound may comprise, for example, a compound of the following Formula 5 or 6, or their mixture. Besides, it may be various noncrosslinkable compounds containing a mesogenic group derived from the compound of Formula 5 or 6, or other various noncrosslinkable liquid crystal compounds previously known in the art. Also, said noncrosslinkable liquid crystal compound may show various phase behavior of liquid crystal such as nematic phase, cholesteric phase, ferroelectric phase, etc.

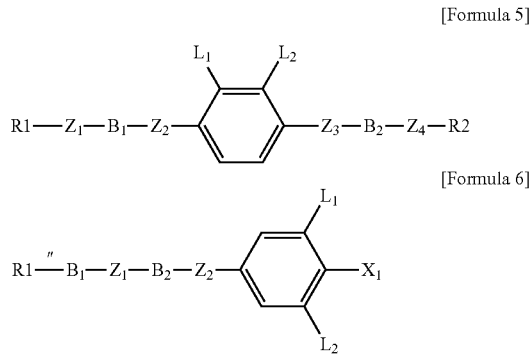

[Formula 5]

[Formula 6]

in the above Formulas 5 and 6, $L_1$ and $L_2$ are independently selected from the group consisting of hydrogen, halogen, unsubstituted or substituted alkyl having 1 to 20 carbon atoms, unsubstituted or substituted alkyl ester having 1 to 8 carbon atoms, unsubstituted or substituted alkyl ether having 1 to 8 carbon atoms, and unsubstituted or substituted alkyl ketone having 1 to 8 carbon atoms, $B_1$ and $B_2$ are independently unsubstituted or substituted arylene having 6 to 20 carbon atoms, preferably unsubstituted or substituted phenylene, or unsubstituted or substituted cycloalkylene having 4 to 8 carbon atoms, preferably unsubstituted or substituted cyclohexylene, R1, R2 and $X_1$ are independently selected from the group consisting of unsubstituted or fluorine-substituted alkyl having 1 to 7 carbon atoms, unsubstituted or fluorine-substituted alkoxy having 1 to 7 carbon atoms, unsubstituted or fluorine-substituted alkenyl having 2 to 7 carbon atoms, unsubstituted or fluorine-substituted alkenyloxy having 2 to 7 carbon atoms, and unsubstituted or fluorine-substituted alkoxyalkyl having 1 to 7 carbon atoms, and $Z_1$, $Z_2$, $Z_3$ and $Z_4$ are independently a single bond, —O, S, COO— or —OCO—.

When the photo-curable composition according to one embodiment of the present invention is irradiated by linearly polarized UV, the photo-reactive functional group in the above-stated photo-alignable polymer may perform a photo-reaction to result in the liquid crystal alignment of the liquid crystal compound under the influence of the photo-alignable polymer which is photo-reacted as above. Also, the liquid crystal alignment of the liquid crystal compound may be stabilized by the crosslink structure of the binder resin formed from the binder mentioned below. Thus, the photo-curable composition according to one embodiment of the present invention may provide a film that shows excellent liquid crystal alignment and optical anisotropy.

In addition, as the above liquid crystal compound shows noncrosslinkable property, there is substantially no worry about crosslink or polymerization of the compound per se even without special control of the initial condition of the photo-alignment. Thus, effective liquid crystal alignment becomes possible without difficult control of condition, and an optical anisotropic film that shows more excellent characteristics can be provided.

On the other hand, the photo-curable composition according to one embodiment of the present invention comprises a photo-curable binder along with the above-stated photo-alignable polymer and the liquid crystal compound. Such a binder forms a binder resin having the network crosslink structure due to the photo-curing to stabilize alignment of the liquid crystal compound.

As the binder, any polymeric compound, oligomer or polymer that is curable by irradiation of UV, etc. may be used with no special limitation. However, for better polymerization, curing or crosslink structure, a (met)acrylate compound such as a muntifunctional (met)acrylate compound having two or more acrylate groups may be used.

As specific examples of such a binder, pentaerythritol triacrylate, tris(2-acrylolyloxyethyl)isocyanurate, trimethylolpropane triacrylate, dipentaerythritol hexaacrylate, etc. may be mentioned, and two or more selected therefrom may also be used.

The photo-curable composition according to one embodiment of the present invention may further comprise a photoinitiator besides the above-stated components. The photoinitiator may be any initiator known to initiate and facilitate photo-curing of the binder. For example, the initiators known under the trade names of Irgacure 907, 819, etc. may be used.

Also, the photo-curable composition may further comprise an organic solvent for dissolving the above-stated components. As examples of this organic solvent, toluene, xylene, anisole, chlorobenzene, dichloromethane, ethyl acetate, dichloroethane, cyclohexanone, cyclopentanone, propylene glycol methyl ether acetate, etc. may be mentioned, and a solvent mixture of two or more selected therefrom may also be used. Besides the above, any solvent that can effectively dissolve each component depending on its type and apply it on a substrate may be used.

The photo-curable composition may comprise about 1 to 50 wt % or about 2 to 20 wt % of the photo-alignable polymer, about 10 to 90 wt % or about 12 to 50 wt % of the non-crosslinkable liquid crystal compound, about 1 to 50 wt % or about 2 to 20 wt % of the binder, and about 0.1 to 5 wt % or about 0.1 to 2 wt % of the photoinitiator, based on the total solid weight. Here, the solid weight may mean the sum of weights of other components than the organic solvent among the components of the photo-curable composition.

The solid content in the photo-curable composition may be about 10 to 80 wt %, thereby the composition may exhibit desirable application characteristics. More specifically, the solid content may be about 15 to 80 wt % when a form of film is to be casted from the photo-curable composition, and the solid content may be about 10 to 40 wt % when a thin film is to be formed.

On the other hand, according to another embodiment of the present invention, there is provided a method for preparing an optical anisotropic film using the above-stated photo-curable composition. This method may comprise a step of photo-aligning at least a part of the photo-alignable polymer by irradiating the polarized UV, e.g., linearly polarized UV, to the above-stated photo-curable composition. If the photo-alignment step is performed under the irradiation of polarized UV, at least a part of the photo-reactive functional group in the photo-alignable polymer may be subjected to photo-reactions such as isomerization or dimerization to be arranged in a certain direction, and at the same time under the influence of such photo-aligned polymer, the noncrosslinkable liquid crystal compound adopts the alignment of the polymer to result in the liquid crystal alignment. Here, since the non-crosslinkable liquid crystal compound does not substantially crosslinked or polymerized under the irradiation of polarized UV, the liquid crystal alignment may be done with good efficiency even without special control of the initial photo-alignment condition.

Consequently, it becomes possible to provide an optical anisotropic film showing excellent optical anisotropy via a very easy and simplified process which comprises the formation of a monolayer only, without separate formation of an alignment layer and a liquid crystal layer.

On the other hand, in the step of photo-alignment, the photo-curable composition may be irradiated by polarized UV having the wavelength ranging from about 150 to 450 nm. However, the wavelength range of polarized UV may be controlled depending on the kind of photo-reactive functional group of the photo-alignable polymer. The irradiation strength of UV may depend on the kind of photo-alignable polymer or that of photo-reactive group bonded thereto, but may be the energy of about 50 $mJ/cm^2$ to 10 $J/cm^2$, preferably the energy of about 500 $mJ/cm^2$ to 5 $J/cm^2$.

UV may be polarized by passing through or being reflected from ① a polarizing system comprising a transparent substrate such as quartz glass, soda lime glass, soda lime-free glass, etc. of which surface is coated with a dielectric anisotropic substance, ② a polarizer on which aluminum or metallic wire is minutely vapor-deposited, or ③ a Brewster angle polarizing system using the reflection from quartz glass, and the composition may be irradiated by UV polarized as such. The polarized UV may be irradiated perpendicular to the surface of substrate or may be irradiated with a specific angle of incidence.

Also, the temperature of substrate during the UV irradiation may be those around room temperature. However, if appropriate, it may be irradiated by UV in the state of being heated under the temperature range of about 100° C. or lower.

Under the polarized UV irradiation in the step of photo-alignment, photo-curing of the binder contained in the photo-curable composition may be concurrently performed. In this case, the optical anisotropic film in the cured form may be prepared only by the single step of photo-alignment. For more effective photo-curing, however, the step of photo-curing the binder by irradiating UV to the photo-curable composition may be additionally carried out after the step of photo-alignment.

As the photo-curing of the binder is carried out, the binder resin having a network crosslink structure may be formed and the liquid crystal compound having the liquid crystal alignment is contained in the crosslink structure, thereby the excellent alignment and optical anisotropy can be stably maintained. Thus, it is possible to prepare the optical anisotropic film showing excellent characteristics.

In the above-stated preparation method, after the photo-curable composition is applied on the substrate and dried, the photo-alignment by the polarized UV may be carried out. The method of application may be suitably selected depending on the kind of photo-alignable polymer, liquid crystal compound or substrate. For example, the application may be selected from roll coating method, spin coating method, printing method, ink-jet method, slit nozzle method, etc.

Additionally, in order to more improve the adhesive property to the substrate, a functional silane-containing compound, a functional fluoro-containing compound or a functional titanium-containing compound may be applied to the substrate in advance.

During the drying step for removing the organic solvent, the solvent may be removed by heating the film or by drying through vacuum evaporation method, etc. Such a drying step may be carried out for about 1 to 20 min at about 50 to 250° C.

According to another embodiment of the present invention, there is provided an optical anisotropic film precursor comprising the above-stated photo-curable composition, which is formed on a substrate. Such a precursor may refer to, for example, the product obtained after application of the photo-curable composition on the substrate and selective drying, during the preparation process of the optical anisotropic film. The photo-alignment step and the selective photo-curing step of the binder may be subjected to the precursor, thereby an optical anisotropic film, etc. showing excellent characteristics can be obtained.

According to another embodiment of the present invention, there is provided an optical anisotropic film comprising the cured product of the above-stated photo-curable composition, which is formed on a substrate. Such an optical anisotropic film can comprise only a monolayer of said cured product, without comprising a separate layer containing the same kind of photo-alignable polymer and/or liquid crystal compound.

This optical anisotropic film may be obtained by a preparation method according to another embodiment of the present invention, for example, by applying a single photo-curable composition comprising both of the photo-alignable polymer and the liquid crystal compound and by carrying out the single photo-alignment step and the selective photo-curing step. Since the phase separation of said composition does not substantially occur during said preparation method, an optical anisotropic film in the form of a monolayer can be provided. This film can show excellent optical anisotropy, etc. even though it is obtained by a very simplified method.

In the optical anisotropic film, the cured product may comprise the photo-alignable polymer wherein at least a part of the photo-reactive functional group is photo-aligned, the binder resin comprising the crosslinked acrylate polymer, and the noncrosslinkable liquid crystal compound which is uniformly dispersed in the crosslink structure of the binder resin. This liquid crystal compound may be in the state of liquid crystal alignment. The degree of liquid crystal alignment may be identified by the luminance between the orthogonally cross-polarized light. For example, if the above optical anisotropic film is placed in the angle of 45° between the orthogonal polarizers, the degree of liquid crystal alignment may be recognized as good when the light leakage is small and the luminance is obtained as much as about 20 $cd/cm^2$ or lower, preferably about 10 $cd/cm^2$ or lower.

The above-stated optical anisotropic film may have a function as liquid crystal alignment film, optical filter, retardation film, polarizer or polarized light emitter, each of which is applicable for optical devices such as liquid crystal display device.

For example, the optical anisotropic film may be included as liquid crystal alignment layer, liquid crystal alignment film, etc. in the liquid crystal cell. The liquid crystal cell comprising the optical anisotropic film may be a polymer dispersed liquid crystal (PDLC), etc. In particular, the optical anisotropic film can act as the liquid crystal alignment layer or liquid crystal alignment film as a monolayer, which does not comprise a separate alignment layer and liquid crystal layer, and can show excellent optical anisotropy and liquid crystal alignment. Thus, the liquid crystal cells—e.g., a polymer dispersed liquid crystal—comprising this optical anisotropic film as the liquid crystal alignment layer can show the thinner thickness and excellent characteristics.

This liquid crystal cell has the conventional constitutions except that it comprises the above optical anisotropic film, and thus additional explanation thereon will be omitted here.

EXAMPLES

Hereinafter, the preferable examples are presented for better understanding of the present invention. However, the following Examples are only for the illustration of the present invention and it is not intended that the scope of the present invention is limited in any manner by them.

Comparative Example 1

Preparation of Optical Anisotropic Film
(Crosslinkable Liquid Crystalline
Substance—Reactive Mesogene was Used)

Poly-cinnamate-hexyl-acrylate (4 wt %) of the following Formula 3a and RM257 (MERCK; 16 wt %) of the following Formula 7 were dissolved in toluene, which was then spin-coated on ITO glass and dried at 80° C. RM257 of Formula 7 is a commercially available liquid crystal compound comprising a crosslinkable or curable unsaturated group (terminal unsaturated double bond). Subsequently, the polarized UV in UV-B region was irradiated at 1 J/cm² to form the optical anisotropic film. The coating property was observed by the naked eye, and the alignment was confirmed by retardation.

[Formula 3a]

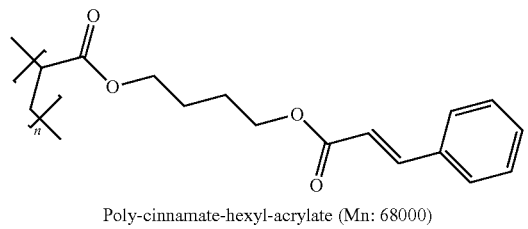

Poly-cinnamate-hexyl-acrylate (Mn: 68000)

[Formula 7]

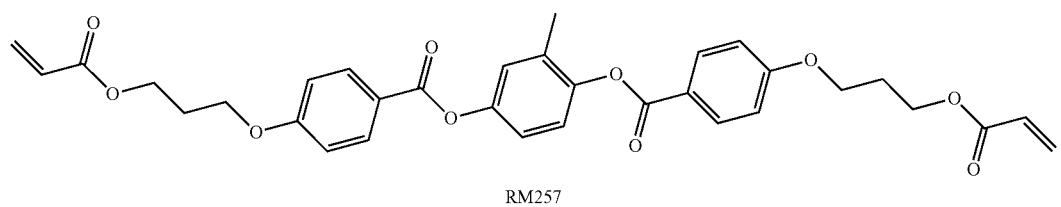

RM257

Comparative Example 2

Preparation of Optical Anisotropic Film
(Crosslinkable Liquid Crystalline
Substance—Reactive Mesogene was Used)

The optical anisotropic film was formed according to the same procedure as Comparative Example 1 except that poly-coumarin-acrylate of the following Formula 3b was used as the photo-alignable polymer instead of poly-cinnamate-hexyl-acrylate. Characteristics such as coating property, alignment, etc. of this film were confirmed according to the same procedure as Comparative Example 1.

[Formula 3b]

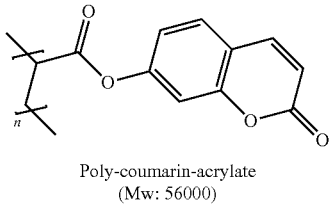

Poly-coumarin-acrylate (Mw: 56000)

Comparative Example 3

Preparation of Optical Anisotropic Film
(Crosslinkable Liquid Crystalline
Substance—Reactive Mesogene was Used)

The optical anisotropic film was formed according to the same procedure as Comparative Example 1 except that poly-chalcone-acrylate of the following Formula 3c was used as the photo-alignable polymer instead of poly-cinnamate-hexyl-acrylate. Characteristics such as coating property, alignment, etc. of this film were confirmed according to the same procedure as Comparative Example 1.

[Formula 3c]

Poly-chalcone-acrylate (Mw: 81000)

Example 1

Preparation of Optical Anisotropic Film
(Noncrosslinkable Liquid Crystal Compound was Used)

The optical anisotropic film was formed according to the same procedure as Comparative Example 1 except that LC11 of the following Formula 8, a noncrosslinkable liquid crystal compound, was used instead of RM257. Characteristics such as coating property, alignment, etc. of this film were confirmed according to the same procedure as Comparative Example 1.

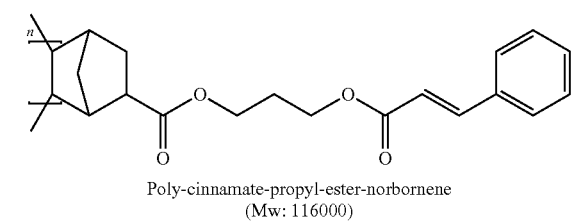

Poly-cinnamate-propyl-ester-norbornene
(Mw: 116000)

[Formula 3d]

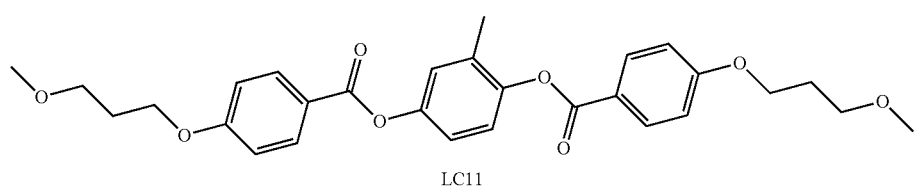

LC11

[Formula 8]

Example 2

Preparation of Optical Anisotropic Film
(Noncrosslinkable Liquid Crystal Compound was Used)

The optical anisotropic film was formed according to the same procedure as Comparative Example 2 except that LC11 of Formula 8, a noncrosslinkable liquid crystal compound, was used instead of RM257. Characteristics such as coating property, alignment, etc. of this film were confirmed according to the same procedure as Comparative Example 2.

Example 3

Preparation of Optical Anisotropic Film
(Noncrosslinkable Liquid Crystal Compound was Used)

The optical anisotropic film was formed according to the same procedure as Comparative Example 3 except that LC11 of Formula 8, a noncrosslinkable liquid crystal compound, was used instead of RM257. Characteristics such as coating property, alignment, etc. of this film were confirmed according to the same procedure as Comparative Example 3.

Example 4

Preparation of Optical Anisotropic Film
(Noncrosslinkable Liquid Crystal Compound was Used)

The optical anisotropic film was formed according to the same procedure as Example 1 except that poly-cinnamate-propyl-ester-norbornene of the following Formula 3d was used as the photo-alignable polymer instead of poly-cinnamate-hexyl-acrylate. Characteristics such as coating property, alignment, etc. of this film were confirmed according to the same procedure as Example 1.

Example 5

Preparation of Optical Anisotropic Film
(Noncrosslinkable Liquid Crystal Compound was Used)

The optical anisotropic film was formed according to the same procedure as Example 1 except that poly-coumarin-ester-norbornene of the following Formula 3e was used as the photo-alignable polymer instead of poly-cinnamate-hexyl-acrylate. Characteristics such as coating property, alignment, etc. of this film were confirmed according to the same procedure as Example 1.

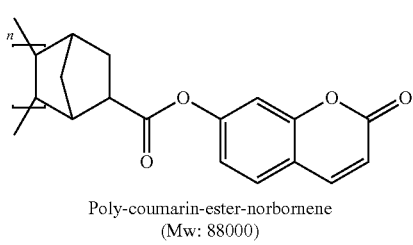

Poly-coumarin-ester-norbornene
(Mw: 88000)

[Formula 3e]

Example 6

Preparation of Optical Anisotropic Film
(Noncrosslinkable Liquid Crystal Compound was Used)

The optical anisotropic film was formed according to the same procedure as Example 1 except that poly-chalcone-ester-norbornene of the following Formula 3f was used as the photo-alignable polymer instead of poly-cinnamate-hexyl-acrylate. Characteristics such as coating property, alignment, etc. of this film were confirmed according to the same procedure as Example 1.

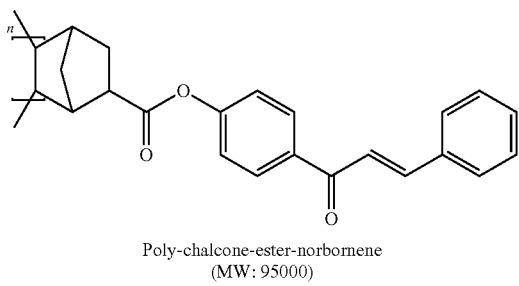

[Formula 3f]

Poly-chalcone-ester-norbornene
(MW: 95000)

Example 7

Preparation of Optical Anisotropic Film
(Noncrosslinkable Liquid Crystal Compound was Used)

The optical anisotropic film was formed according to the same procedure as Example 1 except that PETA (pentaerythritol triacrylate; 1 wt %) and Irgacure 907 (0.1 wt %) were further added to the toluene solution of Example 1. Characteristics such as coating property, alignment, etc. of this film were confirmed according to the same procedure as Example 1.

Example 8

Preparation of Optical Anisotropic Film
(Noncrosslinkable Liquid Crystal Compound was Used)

The optical anisotropic film was formed according to the same procedure as Example 1 except that PETA (pentaerythritol triacrylate; 1 wt %) and Irgacure 907 (0.1 wt %) were further added to the toluene solution of Example 2. Characteristics such as coating property, alignment, etc. of this film were confirmed according to the same procedure as Example 1.

Example 9

Preparation of Optical Anisotropic Film
(Noncrosslinkable Liquid Crystal Compound was Used)

The optical anisotropic film was formed according to the same procedure as Example 1 except that PETA (pentaerythritol triacrylate; 1 wt %) and Irgacure 907 (0.1 wt %) were further added to the toluene solution of Example 3. Characteristics such as coating property, alignment, etc. of this film were confirmed according to the same procedure as Example 1.

Example 10

Preparation of Optical Anisotropic Film
(Noncrosslinkable Liquid Crystal Compound was Used)

The optical anisotropic film was formed according to the same procedure as Example 1 except that PETA (pentaerythritol triacrylate; 1 wt %) and Irgacure 907 (0.1 wt %) were further added to the toluene solution of Example 4. Characteristics such as coating property, alignment, etc. of this film were confirmed according to the same procedure as Example 1.

Example 11

Preparation of Optical Anisotropic Film
(Noncrosslinkable Liquid Crystal Compound was Used)

The optical anisotropic film was formed according to the same procedure as Example 1 except that PETA (pentaerythritol triacrylate; 1 wt %) and Irgacure 907 (0.1 wt %) were further added to the toluene solution of Example 5. Characteristics such as coating property, alignment, etc. of this film were confirmed according to the same procedure as Example 1.

Example 12

Preparation of Optical Anisotropic Film
(Noncrosslinkable Liquid Crystal Compound was Used)

The optical anisotropic film was formed according to the same procedure as Example 1 except that PETA (pentaerythritol triacrylate; 1 wt %) and Irgacure 907 (0.1 wt %) were further added to the toluene solution of Example 6. Characteristics such as coating property, alignment, etc. of this film were confirmed according to the same procedure as Example 1.

Example 13

Preparation of Optical Anisotropic Film
(Noncrosslinkable Liquid Crystal Compound was Used)

The optical anisotropic film was formed according to the same procedure as Example 7 except that LC12 of the following Formula 9 was used as a noncrosslinkable liquid crystal compound instead of LC11. Characteristics such as coating property, alignment, etc. of this film were confirmed according to the same procedure as Example 1.

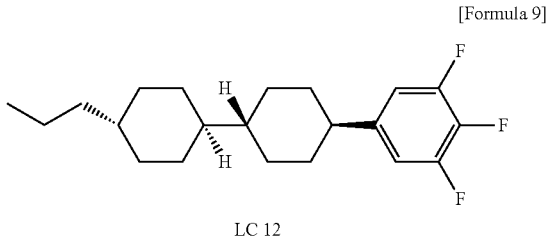 [SMILES: CCC[C@H]1CC[C@H]([C@H]2CC[C@H](c3cc(F)c(F)c(F)c3)CC2)CC1]

[Formula 9]

LC 12

Experiment

Evaluation of Coating Property and Degree of Light Leakage of Film

The films of Examples and Comparative Examples were placed in the angle of 45° between the orthogonal polarizers, and the degrees of stain and light leakage were observed by the naked eye to evaluate the coating property of each composition. The evaluation standard was as follows:

○: Stain and particle are not observed on the cured film.

Δ: Stain or particle is observed on the cured film, but it is not to the point of causing haze on the film.

X: Lots of stain and particle are observed on the cured film, and they cause haze on the film.

The degree of liquid crystal alignment was assessed based on the luminance due to light leakage measured by a spectrometer, wherein the backlight irradiated was 6000 cd/cm². The degree of liquid crystal alignment may be determined as excellent when the luminance is 10 cd/cm² or lower, and the degree of liquid crystal alignment may be determined as good when the luminance is 10-20 cd/cm².

The results of measurement and evaluation on the coating property and luminance are shown in the following Table 1.

TABLE 1

| Entry | Coating Property | Luminance (cd/cm²) |
|---|---|---|
| Comparative Example 1 | Δ | 44 |
| Comparative Example 2 | X | — |
| Comparative Example 3 | X | — |
| Example 1 | ○ | 25 |
| Example 2 | Δ | 29 |
| Example 3 | Δ | 24 |
| Example 4 | ○ | 14 |
| Example 5 | Δ | 15 |
| Example 6 | ○ | 14 |
| Example 7 | ○ | 11 |
| Example 8 | Δ | 10 |
| Example 9 | ○ | 13 |
| Example 10 | ○ | 6 |
| Example 11 | ○ | 8 |
| Example 12 | ○ | 6 |
| Example 13 | ○ | 7 |

Referring to the above Table 1, it has been confirmed that the films obtained in Examples 1 to 13 show excellent coating property, low luminance due to light leakage and excellent liquid crystal alignment. On the contrary, the films of Comparative Examples 2 and 3 show very high light leakage and very poor coating property, and the film of Comparative Example 1 shows poor liquid crystal alignment due to very high luminance, and high light leakage.

The above result is considered to be obtained since the films of Comparative Examples are prepared from the composition comprising a crosslinkable liquid crystalline substance, and a considerable amount of the liquid crystalline substance is crosslinked or polymerized before it is subjected to liquid crystal alignment under the influence of the photo-alignable polymer.

What is claimed is:

1. A photo-curable composition which comprises a photo-alignable polymer, a noncrosslinkable liquid crystal compound and a photo-curable binder, wherein the photo-alignable polymer is a polymer containing a photo-reactive functional group of cinnamate functional group, chalcone functional group, azo functional group or coumarin functional group.

2. The photo-curable composition according to claim 1, wherein the photo-reactive functional group is one or more functional groups selected from the group consisting of a cinnamate functional group having the following Formula 1a, a coumarin functional group having the following Formula 1b, an azo functional group having the following Formula 1c, a chalcone functional group having the following Formula 1d and a chalcone functional group having the following Formula 1e:

[Formula 1a]
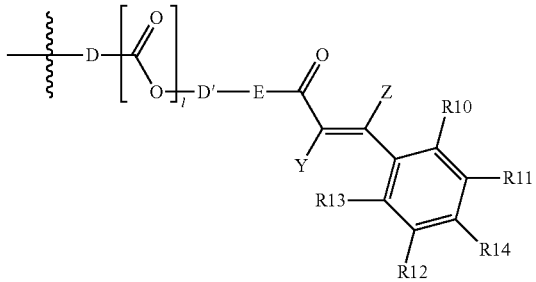

[Formula 1b]
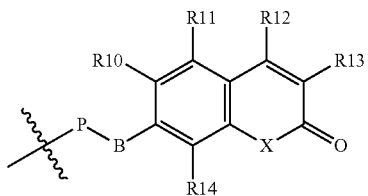

[Formula 1c]
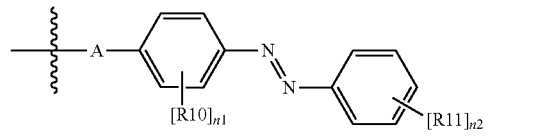

[Formula 1d]
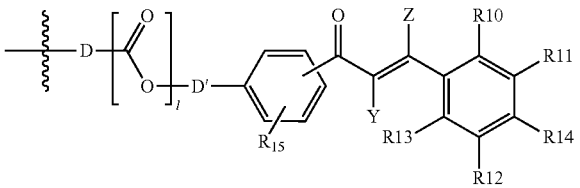

[Formula 1e]
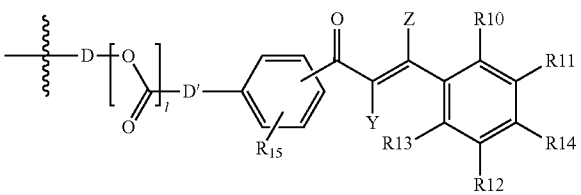

in the above Formulas 1a to 1e, n1 is an integer of 0 to 4, n2 is an integer of 0 to 5, l is 0 or 1, A represents unsubstituted or substituted alkylene having 1 to 20 carbon atoms, carbonyl, carboxy, unsubstituted or substituted arylene having 6 to 40 carbon atoms, or a single bond, B is selected from the group consisting of a single bond; unsubstituted or substituted alkylene having 1 to 20 carbon atoms; carbonyl; carboxy; ester; unsubstituted or substituted alkoxylene having 1 to 10 carbon atoms; unsubstituted or substituted arylene having 6 to 40 carbon atoms; and unsubstituted or substituted heteroarylene having 6 to 40 carbon atoms, D and D' are independently selected from the group consisting of a single bond; oxygen; unsubstituted or substituted alkylene having 1 to 20 carbon atoms; unsubstituted or substituted cycloalkylene having 3 to 12 carbon atoms; and unsubstituted or substituted alkylene oxide having 1 to 20 carbon atoms, E represents a single bond; unsubstituted or substituted alkylene having 1 to 20 carbon atoms; or unsubstituted or substituted arylene oxide having 6 to 40 carbon atoms, X represents oxygen or sulfur, Y and Z independently represent hydrogen; or unsubstituted or substituted alkyl having 1 to 20 carbon atoms, P is selected from the group consisting of a single bond; unsubstituted or substituted alkylene having 1 to 20 carbon atoms; carbonyl; unsubstituted or substituted alkenylene having 2 to 20 carbon atoms; unsubstituted or substituted cycloalkylene having 3 to 12 carbon atoms; unsubstituted or substituted arylene having 6 to 40 carbon atoms; unsubstituted or substituted aralkylene having 7 to 15 carbon atoms; and unsubstituted or substituted alkynylene having 2 to 20 carbon atoms, R10, R11, R12, R13 and R14 are the same as or different from each other and are independently selected from the group consisting of hydrogen; halogen; unsubstituted or substituted alkyl having 1 to 20 carbon atoms; unsubstituted or substituted cycloalkyl having 4 to 8 carbon atoms; unsubstituted or substituted alkoxy having 1 to 20 carbon atoms; unsubstituted or substituted aryloxy having 6 to 30 carbon atoms; unsubstituted or substituted aryl having 6 to 40 carbon atoms; heteroaryl having 6 to 40 carbon atoms and containing a heteroatom from Group XIV, XV or XVI of periodic table; unsubstituted or substituted alkoxyaryl having 6 to 40 carbon atoms; cyano; nitrile; nitro; and hydroxy, and $R_{15}$ is one or two substituents which are independently selected from the group consisting of hydrogen; halogen; cyano; unsubstituted or substituted alkyl having 1 to 20 carbon atoms; unsubstituted or substituted alkoxy having 1 to 20 carbon atoms; unsubstituted or substituted aryloxy having 6 to 30 carbon atoms; unsubstituted or substituted aryl having 6 to 40 carbon atoms; heteroaryl having 6 to 40 carbon atoms and containing a heteroatom from Group XIV, XV or XVI of periodic table; and unsubstituted or substituted alkoxyaryl having 6 to 40 carbon atoms.

3. The photo-curable composition according to claim 1, wherein the photo-alignable polymer comprises a cyclic olefin repeating unit having one or more photo-reactive functional groups.

4. The photo-curable composition according to claim 2, wherein the photo-alignable polymer comprises a repeating unit of the following Formula 3 or 4:

[Formula 3]

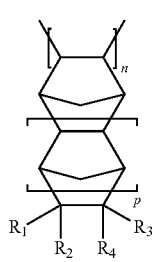

[Formula 4]

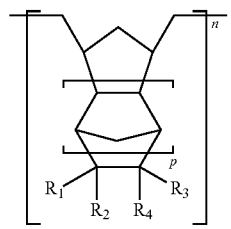

in the above Formulas 3 and 4, n is 50 to 5,000, p is an integer of 0 to 4, and at least one of $R_1$, $R_2$, $R_3$ and $R_4$ is a radical selected from the group consisting of the above Formulas 1a to 1e, and the others may be the same as or different from each other and are independently polar functional groups selected from the group consisting of hydrogen; halogen; unsubstituted or substituted alkyl having 1 to 20 carbon atoms; unsubstituted or substituted alkenyl having 2 to 20 carbon atoms; unsubstituted or substituted cycloalkyl having 5 to 12 carbon atoms; unsubstituted or substituted aryl having 6 to 40 carbon atoms; unsubstituted or substituted aralkyl having 7 to 15 carbon atoms; unsubstituted or substituted alkynyl having 2 to 20 carbon atoms; and non-hydrocarbonaceous polar group containing one or more atoms selected from the group consisting of oxygen, nitrogen, phosphorous, sulfur, silicon and boron.

5. The photo-curable composition according to claim 1, wherein the noncrosslinkable liquid crystal compound contains a mesogene group and does not contain a curable or crosslinkable group.

6. The photo-curable composition according to claim 1, wherein the noncrosslinkable liquid crystal compound has nematic phase, cholesteric phase or ferroelectric phase.

7. The photo-curable composition according to claim 1, wherein the noncrosslinkable liquid crystal compound comprises a compound of the following Formula 5 or 6:

[Formula 5]

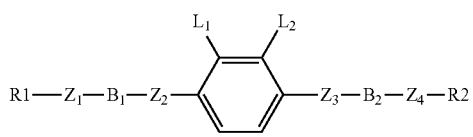

[Formula 6]

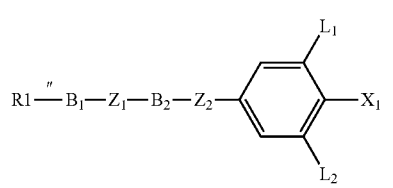

in the above Formulas 5 and 6, $L_1$ and $L_2$ are independently selected from the group consisting of hydrogen, halogen, unsubstituted or substituted alkyl having 1 to 20 carbon atoms, unsubstituted or substituted alkyl ester having 1 to 8 carbon atoms, unsubstituted or substituted alkyl ether having 1 to 8 carbon atoms, and unsubstituted or substituted alkyl ketone having 1 to 8 carbon atoms, B₁ and B₂ are independently unsubstituted or substituted arylene having 6 to 20 carbon atoms or unsubstituted or substituted cycloalkylene having 4 to 8 carbon atoms, R1, R2 and $X_1$ are independently selected from the group consisting of unsubstituted or fluorine-substituted alkyl having 1 to 7 carbon atoms, unsubstituted or fluorine-substituted alkoxy having 1 to 7 carbon atoms, and unsubstituted or fluorine-substituted alkoxyalkyl having 1 to 7 carbon atoms, and $Z_1$, $Z_2$, $Z_3$ and $Z_4$ are independently a single bond, —O—, —S—, —COO— or —OCO—.

8. The photo-curable composition according to claim 1, wherein the photo-curable binder comprises a (met)acrylate compound having at least di-functional acrylate groups.

9. The photo-curable composition according to claim 8, wherein the (met)acrylate compound comprises one or more selected from the group consisting of pentaerythritol triacrylate, tris(2-acrylolyloxyethyl)isocyanurate, trimethylolpropane triacrylate and dipentaerythritol hexaacrylate.

10. The photo-curable composition according to claim 1, which further comprises a photoinitiator initiating UV curing.

11. The photo-curable composition according to claim 10, which comprises 1 to 50 wt % of the photo-alignable polymer, 10 to 90 wt % of the noncrosslinkable liquid crystal compound, 1 to 50 wt % of the binder, and 0.1 to 5 wt % of the photoinitiator, based on the total solid weight of the composition.

12. The photo-curable composition according to claim 1, which further comprises an organic solvent.

13. A method for preparing an optical anisotropic film, which comprises a step of photo-aligning at least a part of a photo-alignable polymer by irradiating polarized UV light on the photo-curable composition of claim 1.

14. The method for preparing an optical anisotropic film according to claim 13, wherein liquid crystal alignment of the noncrosslinkable liquid crystal compound is performed concurrently with the step of photo-alignment.

15. The method for preparing an optical anisotropic film according to claim 13, which further comprises a step of photo-curing the binder by irradiating UV on the photo-curable composition, after the step of photo-alignment.

16. An optical anisotropic film precursor which comprises the photo-curable composition of claim 1 and which is formed on a substrate.

17. An optical anisotropic film which comprises a cured product of the photo-curable composition of claim 1 and which is formed on a substrate.

18. The optical anisotropic film according to claim 17, which comprises a monolayer of the cured product.

19. The optical anisotropic film according to claim 18, wherein the cured product comprises a photo-alignable polymer wherein at least a part of the photo-reactive functional group is photo-aligned, a binder resin comprising a crosslinked acrylate polymer, and a noncrosslinkable liquid crystal compound which is contained in the crosslink structure of the binder resin.

20. The optical anisotropic film according to claim 18, wherein luminance due to light leakage is 20 cd/cm² or lower when the optical anisotropic film is placed between the orthogonal polarizers.

21. The optical anisotropic film according to claim 17, which has a function as liquid crystal alignment layer, liquid crystal alignment film, optical filter, retardation film, polarizer or polarized light emitter.

22. A liquid crystal cell which comprises the optical anisotropic film of claim 17.

23. The liquid crystal cell according to claim 22, which is a polymer dispersed liquid crystal (PDLC).

* * * * *